United States Patent
Yamamoto

[11] Patent Number: 6,088,633
[45] Date of Patent: Jul. 11, 2000

[54] MOBILE BODY CONTROLLING GEAR

[75] Inventor: Michio Yamamoto, Mobara, Japan

[73] Assignee: Futaba Denshi Kogyo Kabushiki Kaisha, Mobara, Japan

[21] Appl. No.: 09/264,677

[22] Filed: Mar. 9, 1999

[51] Int. Cl.[7] .................................................. G06F 7/00
[52] U.S. Cl. ............................... 701/3; 701/14; 318/609; 318/610; 364/160
[58] Field of Search .............................. 701/3, 8, 10, 14; 318/609, 610; 364/160, 161, 162, 163

[56] References Cited

U.S. PATENT DOCUMENTS

| | | | |
|---|---|---|---|
| 4,641,235 | 2/1987 | Yamashita et al. | 192/0.032 |
| 4,882,526 | 11/1989 | Lino et al. | 318/561 |
| 5,082,096 | 1/1992 | Yamashita et al. | 192/0.032 |

*Primary Examiner*—William A. Cuchlinski, Jr.
*Assistant Examiner*—Yonel Beaulieu
*Attorney, Agent, or Firm*—Oblon, Spivak, McClelland, Maier & Neustadt, P.C.

[57] ABSTRACT

A mobile body controlling gear is provided that can suppress an occurrence of yaw motion due to an offset when the P control is switched to the PID control. The yaw-axis control signal Ep is added to the control signal from the P/PID controller. The added signal is input to the actuator. The yaw-axis driving unit performs yaw-axis control. The yaw-axis angular velocity detection sensor signal Sa is compared with the reference signal r. Then the P/PID controller receives the comparison signal. The reference value memory holds the yaw-axis control signal Ep immediately before the P/PID switching unit switches the P control mode to the PID control mode. The yaw-axis control signal Ep is handled as the reference signal rb for the PID control. The reference value rb is added to the angular velocity zero detection reference value rz and to the yaw-axis control signal Ep. The resultant sum is input to the PID terminal of the P/PID switching unit. The error between the resultant sum and the yaw-axis angular velocity sensor output Sa is output as an error to the P/PID controller.

8 Claims, 3 Drawing Sheets

MOBILE BODY CONTROLLING GEAR

BACKGROUND OF THE INVENTION

The present invention relates to a mobile body controlling gear and more particularly to a controlling gear suitable for the yaw axis attitude control of a mobile body such as a model helicopter, model air-craft, or the like.

In order to manipulate a model helicopter, the gyroscope (tail stabilizer) is an auxiliary device essential for stabilizing the yaw-axis control. Without the gyroscope mounted, the helicopter horizontally yaws because of no autonomous stability function to the yaw-axis.

In the yaw-axis manipulation of a model helicopter, a yaw-axis rotary motion occurs under control commands from the manipulation side to turn the nose of the helicopter in a target direction. The gyroscope can control the reciprocal control, that is, of stopping the rotation of the yaw-axis when control commands do not come from the manipulation side and of quickly rotating the yaw-axis in response to control commands from the manipulation side. In the gyroscope configuration for a model helicopter, the rotational speed of the helicopter is detected by calculating an error between a signal from an angular velocity detection sensor equipped to a model helicopter and a reference signal being an angular velocity target value. The resultant signal is transmitted to the yaw-axis control actuator of the helicopter and is subjected to feedback control to null the angular velocity of the yaw-axis.

Conventionally, the P (proportional) control system, which can provide a simplified configuration, has been employed as the feedback control method. In the P control system, the output from the controller is proportional to an error of a measurement value to a target value.

FIG. 2 is a block diagram illustrating a conventional yaw-axis controlling gear employing the P control system. Referring to FIG. 2, reference numerals 21, 23 and 11 represent addition points; 22 represents a P controller: 9 represents an actuator; 10 represents a yaw-axis driving unit; 12 represents an airframe; and 13 represents a yaw-axis angular velocity detection sensor.

A rate gyroscope or piezoelectric vibration gyroscope (piezoelectric vibration angular velocity detection sensor), for example, is used as the yaw-axis angular velocity detection sensor 13. The angular velocity signal measured by the yaw-axis angular velocity detection sensor 13 is subtracted from the angular velocity zero reference value at the addition point 21. The P controller 22 receives the resultant difference. The output of the P controller 22 is added to the yaw-axis control signal at the addition point 23. The actuator 22 receives the resultant sum. The yaw-axis driving unit 10 adjusts the pitch angle of the tail rotor in response to the output from the actuator 9, thus varying the drive force around the yaw-axis.

At the virtual addition point 11, the output from the yaw-axis driving unit 10 is added to disturbance such as a counterforce of a helicopter or wind. The resultant sum is sent to the airframe 12. The yaw-axis angular velocity detection sensor 13 detects the angular velocity around the yaw-axis of the airframe. The detected output is coupled to the addition point 21. There is a control loop (not shown in FIG. 2) which provides yaw-axis control signals by manipulating the stick of a wireless controlling gear and then transmitting remote control signals to the airframe while the operator of a wireless controlled helicopter is observing angles around the yaw-axis.

In order to perform the yaw-axis control operation in the gyroscope employing the P control system, the sensor output signal from the yaw-axis angular velocity detection sensor 13 functions as an angular velocity correction signal. The manipulation side provides a yaw-axis control signal with the opposite polarity to that of the angular velocity correction signal to the output of the P controller 22. The rotary motion of the yaw-axis occurs according to the resultant difference. The yaw-axis angular velocity detection sensor 13 handles even disturbance as the yaw-axis control signal. A rotary motion occurs proportional to the offset of an angular velocity acting as the input of the P controller 22. As a result, the conventional system has the disadvantage in that since the yaw-axis shifts due to disturbance such as side wind, it is difficult to hovers the helicopter accurately.

Recently, the PID control system built-in gyroscope for purpose of model helicopters that can cancel the offset causing the drawback of the above-mentioned P control system has been commercially introduced. The PID control system performs an integration operation for integrating existing errors and then outputting the result and a differential operation for outputting values proportional to changes in error, in addition to the proportional operation for handling the adjuster output as values proportional to the error. The differential operation is not solely used but is used to improve the proportional operation and the integration operation. For that reason, in the patent specification, the PID control system and the PID control system are handled as the same category.

FIG. 3 is a block diagram illustrating a yaw-axis controlling gear employing the PID control system. In FIG. 3, like reference numerals represent the same constituent elements as those in FIG. 2. Hence, the duplicate description is omitted here. Reference numeral 31 represents an addition point and 32 represents a PID controller.

The output signal from the yaw-axis angular velocity detection sensor 13 is added to the angular velocity zero reference value and to the yaw-axis control signal at the addition point 31. The PID controller receives the added signal and then sends the result to the actuator 9. The yaw-axis driving unit 10 receives the output from the actuator 9 and then adjusts the drive force around the yaw-axis to vary the pitch angle of the tail rotor. The virtual addition point 11 adds the output from the yaw-axis driving unit 10 to a disturbance. Then the yaw-axis driving unit 10 sends the result to the airframe 12. The yaw-axis angular velocity detection sensor 13 detects the angular velocity around the yaw-axis. The detection output is fed back to the addition point 31.

In the PID control system, the yaw-axis control signal on the manipulation side is controlled so as to offset the angular velocity zero reference value being the target value of the gyroscope. That is, the control signal is not disturbance but acts as a yaw-axis angular velocity command signal. The P control differs from the PID control in that the control signal on the manipulation side is differently operated on the gyroscope side. The PID control system can configure a very stable system because the disturbance is corrected under the I control. However, the PID system has the disadvantage in that if a degraded transient response and an abruptly-changing yaw-axis control signal are provided under the I control, the time until the motion of the yaw-axis stops is prolonged, compared with the P control. Hence, it may be considered to use a controller that can switch the status to the P control or the PID control so that the P control and the PID control is suitably selected according to the flight pattern of a helicopter.

In the P control system, it is needed to perform a trim operation at the beginning of the flight of a helicopter as initialization for stopping the yaw-axis. In this trim operation, a stable balanced state is accomplished at the neutral position of the manipulation stick on a controlling gear by moving the trim lever every manipulation contents and adding a trim correction signal from the manipulation side to a control signal. The trim correction signal is handled as a balance reference value (neutral value) of a control signal at the P control time. In FIG. 2, the reference value corresponding to the balance state is added to the addition point 21.

On the other hand, the PID control, shown in FIG. 3, does not require the trim operation under the I control because the gyroscope side performs the correcting operation. However, there is the disadvantage in that when the status is switched from the P control mode to the PID control mode, the balance reference value added in the P control operation is viewed as an angular velocity command signal from the PID control side, thus resulting in the occurrence of the yaw-axis motion.

A controlling gear that respectively uses a trim correction signal for the P control and a trim correction signal for the PID control may be employed to solve the above-described problems. However, this approach results in complicating the controlling gear and increasing the fabrication costs.

SUMMARY OF THE INVENTION

The present invention is made to solve the above-mentioned problems.

Moreover, the objective of the invention is to provide a mobile body controlling gear that can suppress an occurrence of movement due to an offset when the status is switched from a P control mode to a PID control mode.

The objective of the present invention is achieved by a mobile body controlling gear comprising a controller switched to a P control mode or a PID control mode to manipulate a mobile body; and memory means for holding a balance reference value of a control signal at a manipulation side in the P control mode; wherein the controller controls the mobile body in the PID mode by subtracting the balance reference signal held in the memory means from an error signal input to the controller when status is switched from the P control mode to the PID control mode, so that an offset due to a balance reference signal of the control signal in the P control mode is canceled.

Hence, according to the present invention, the mobile body controlling gear performs the P control mode when a quick response is required to abrupt changes and performs the PID control mode when stability is required to disturbance, so that the control systems can be switched according to situations. Thus, when the status is switched from the P control mode to the PID control mode, an occurrence of movement due to an offset can be suppressed by canceling the error which occurs due to a balance reference value of a control output signal in the P control mode.

According to the present invention, a mobile body controlling gear comprises a controller switched to a P control mode or a PID control mode to manipulate a mobile body; and memory means for holding a balance reference value of a control signal at a manipulation side in the P control mode; wherein the controller controls the mobile body in the P control mode by inputting an error of a target value and a measurement signal in the P control mode, and controls the mobile body in the PID control mode by inputting an error between the target value and the control signal on the manipulation side or between the target value and the measurement value signal in the PID control mode, and controls the mobile body in the PID control mode by subtracting the balance reference value held in the memory means from the error input to the controller when status is switched from the P control mode to the PID control mode; the controller outputting an output signal of the controller and the control signal to the mobile body to cancel an offset due to a balance reference signal of the control signal in the P control mode.

Hence, according to the present invention, the mobile body controlling gear performs the P control mode when a quick response is required to abrupt changes and performs the PID control mode when stability is required to disturbance, so that the control systems can be switched according to situations. Thus, when the status is switched from the P control mode to the PID control mode, the error which occurs due to a balance reference value of a control output signal in the P control mode can be cancelled by a simplified configuration, so that an occurrence of movement due to an offset can be suppressed.

Furthermore, in the mobile body controlling gear according to the present invention, the mobile body is a model helicopter. The measurement value signal is a yaw-axis angular detection signal. The controller controls a feedback of the yaw-axis angular velocity.

Hence, the response to the yaw-axis control system and the stability to disturbance can be improved by switching the control systems according to flight conditions of a helicopter. Moreover, an occurrence of the yaw-axis motion can be suppressed when status is switched from the PID control system to the P control system.

BRIEF DESCRIPTION OF THE INVENTION

This and other objects, features, and advantages of the present invention will become more apparent upon a reading of the following detailed description and drawings, in which.

DESCRIPTION OF THE EMBODIMENTS

An embodiment of the present invention will be described below with reference to the attached drawings.

Figure 1:
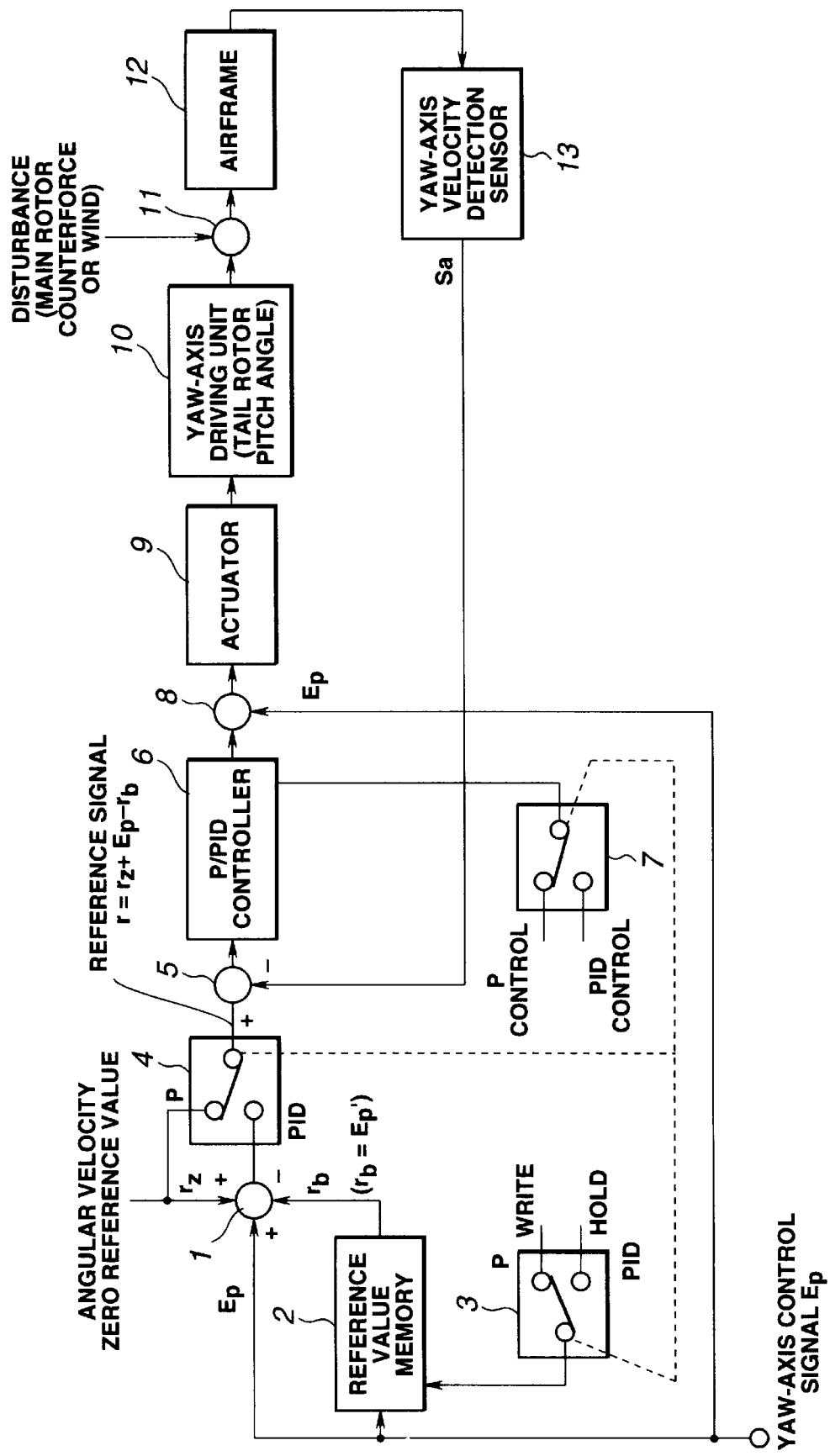
FIG. 1 is a block diagram illustrating a yaw-axis controlling gear according to an embodiment of the present invention.
Figure 2:
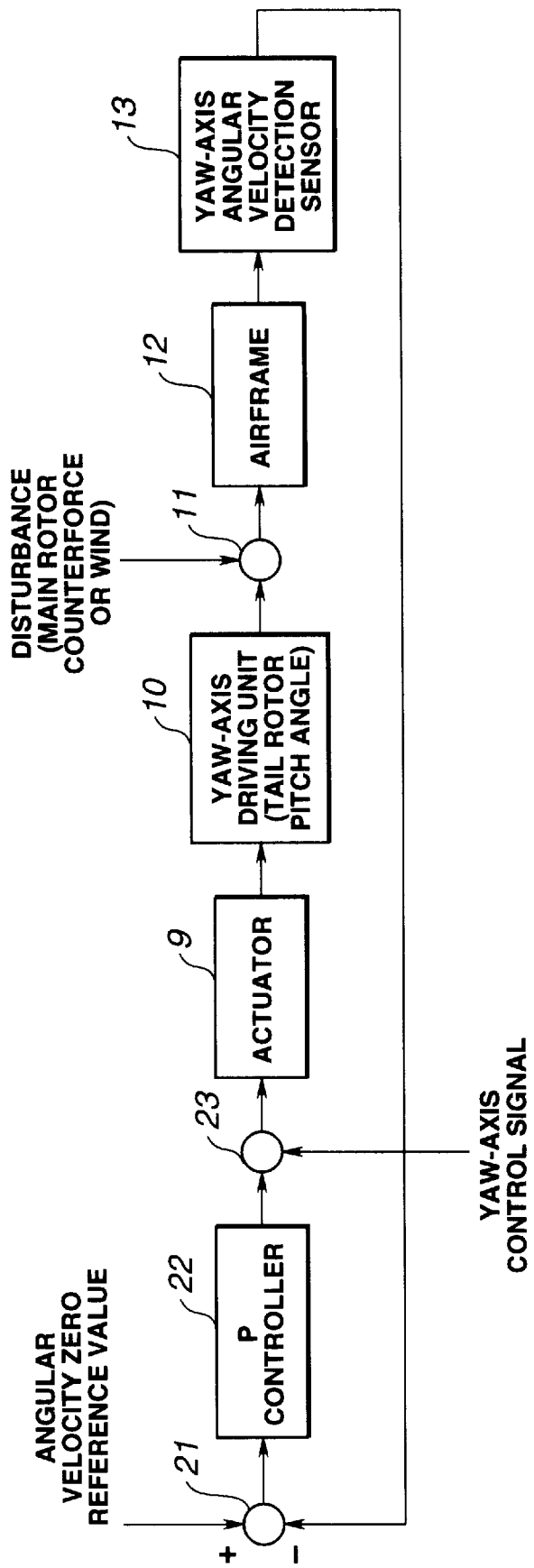
FIG. 2 is block diagram illustrating a conventional yaw-axis controlling gear according to a P control system.
Figure 3:
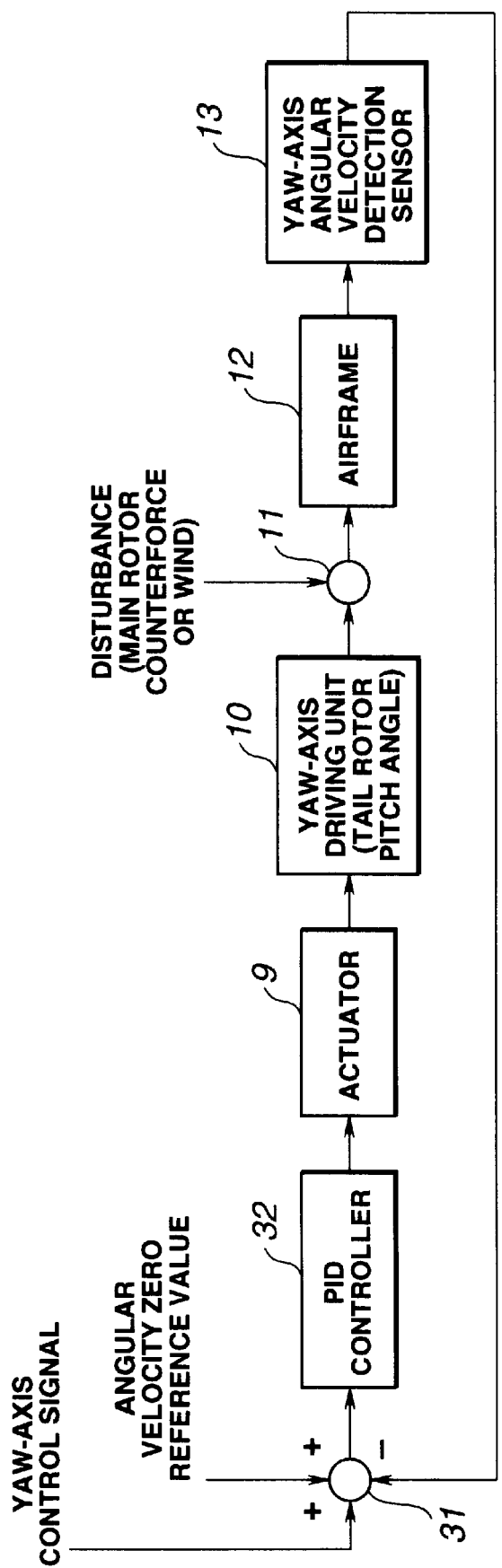
FIG. 3 is a block diagram illustrating a yaw-axis controlling gear according to a PID control system.

FIG. 1 is a block diagram showing a yaw-axis controlling gear according to an embodiment of the present invention. In FIG. 1, like reference numerals represent the same constituent elements as those in FIG. 2. Hence, the duplicate description will be omitted here.

Referring to FIG. 1, reference numerals 1, 5 and 8 represent addition points; 2 represents a reference value memory; 3, 4 and 7 represent P/PID switching units; and 6 represents a P/PID controller.

The yaw-axis control signal Ep from the controlling gear is added to the control signal from the P/PID controller 6 at the addition point 8. The result is input to the actuator 9. The yaw-axis driving unit 10 performs the yaw-axis control. The yaw-axis angular velocity detection sensor mounted on a model helicopter produces a sensor signal Sa. The addition point 5 compares the sensor signal Sa with a reference signal r (to be described later). The P/PID controller 6 receives the resultant error signal and then creates a control signal. Each of the P/PID switching units 3, 4, and 7 operates to select the P or PID control mode by the control signal from the manipulation side.

First, the case where the P/PID controller 6 is in the P control mode by means of the P/PID switching unit 7 will be described here. When the P/PID switching unit 3 is switched to a write mode, the reference value memory 2 holds the yaw-axis operation signal Ep. However, the P/PID switching unit 4 does not output the yaw-axis operation signal Ep to the addition point 5. The P/PID switching unit 4 outputs an angular velocity zero reference value rz as the reference signal r to the addition point 5. Hence, this circuit configuration corresponds to the block diagram of the P control system shown in FIG. 2.

Next, the case where the P/PID switching unit 7 selects the P/PID controller 6 in the PID control mode will be described here. The reference value memory 2 stores the reference value rb in the PID control mode. The memory 2 holds the yaw-axis control signal Ep written immediately before the status is changed from the P control mode to the PID control mode by the P/PID switching unit 3. The yaw-axis control signal Ep is handled as a reference signal rb for the PID control. The addition point 1 adds the reference value rb in the PID control mode to the angular velocity zero detection reference value rz and the yaw-axis control signal Ep and then outputs the result to the PID terminal of the P/PID switching unit 4. Hence, in the PID control mode, the reference signal r becomes (rz+Ep−rb). Moreover, the reference signal r is output to the addition point 5 via the P/PID switching unit 4. Then the P/PID controller 6 receives the error to the yaw-axis angular velocity detection sensor Sa.

In an actual usage, a helicopter first flies under the P control. The operator varies the yaw-axis control signal Ep through the trim operation and then sets the airframe to a neutral state in which the yaw-axis is still. In this state, the trim operation under the P control has been completed. After an operator manipulates a helicopter under the P control, the status is changed to the PID mode in the neutral state. At this time, when the status is neutral under the P control, the yaw-axis control signal Ep' is held in the reference value memory 2. The reference signal r is expressed by the formula: r=rz+Ep−rb=rz+(Ep−Ep'). When the P/PID controller 6 is switched to the PID control mode, the trim offset (Ep') due to the switching operation under the P control can be canceled. As described above, the reference value memory 2 stores the yaw-axis operation signal Ep as Ep' at the transition when the status is switched from the P control mode to the PID control mode. Then the trim shift can be avoided by normalizing angular velocity command signal on the PID control side.

Even in the PID control mode, the yaw-axis control signal Ep is input to the actuator 9, together with the output from the P/PID controller 6. Thus, the responsivity is improved by performing the feedback control and the feed-forward control at the same time. However, the feed-forward control may be omitted.

Because the offset is automatically nulled under P control, any trouble does not occur when the status is switched from the PID control mode to the P control mode.

The yaw-axis controlling gear for the wireless controlled model helicopter has been described above. However, the present invention is applicable to 2-axis control of vehicles other than model helicopters, to the roll axis control and to the pitch axis control. Moreover, the present invention is applicable to manipulation of the yaw-axis and others of a model airplane, manipulation of the yaw-axis and others of a remote-controlled helicopter or airplane for aerial photographing, agricultural chemicals sprinkling, manipulation of a model motorboat or model automobile, or manipulation of general mobile bodies.

As understood from the above description, according to the present invention has the advantage in that an offset of the balance reference value in the P-condition mode can be canceled in the PID control mode when the status is changed from the P control to the PID control. For example, when the present invention can be embodied to control the yaw-axis of a wireless controlled helicopter or airplane, an attitude control can be performed adaptively to the flight pattern.

What is claimed is:

1. A mobile body controlling gear comprising:
   a controller switched to a P control mode or a PID control mode to manipulate a mobile body; and
   memory means for holding a balance reference value of a control signal at a manipulation side in the P control mode;
   wherein said controller controls said mobile body in the PID mode by subtracting the balance reference signal held in said memory means from an error signal input to said controller a when status is switched from the P control mode to the PID control mode, so that an offset due to the balance reference signal of the control signal in said P control mode is canceled.

2. A mobile body controlling gear comprising:
   a controller switched to a P control mode or a PID control mode to manipulate a mobile body; and
   memory means for holding a balance reference value of a control signal at a manipulation side in the P control mode;
   wherein said controller controls said mobile body in the P control mode by inputting an error of a target value and a measurement signal in the P control mode, and controls said mobile body in the PID control mode by inputting an error between the target value and said control signal on the manipulation side or between the target value and said measurement value signal in the PID control mode, and controls said mobile body in the PID control mode by subtracting said balance reference value held in said memory means from said error input to said controller when status is switched from the P control mode to the PID control mode;
   said controller outputting an output signal of said controller and the control signal to said mobile body to cancel an offset due to a balance reference signal of the control signal in the P control mode.

3. A mobile body controlling gear defined in claim 1, wherein said mobile body is a model helicopter; wherein said measurement value signal is a yaw-axis angular detection signal; and wherein said controller controls a feedback of said yaw-axis angular velocity.

4. A mobile body controlling gear defined in claim 2, wherein said mobile body is a model helicopter, said measurement value signal is a yaw-axis angular detection signal, and said controller controls a feedback of said yaw-axis angular velocity.

5. A mobile body controlling gear comprising:
   a controller switched to a P control mode or a PID control mode to manipulate a mobile body; and
   a memory configured to hold a balance reference value of a control signal at a manipulation side in the P control mode, wherein said controller controls said mobile body in the PID mode by subtracting the balance reference signal held in said memory from an error signal input to said controller when a status is switched from the P control mode to the PID control mode, so that an offset due to the balance reference signal of the control signal in said P control mode is canceled.

6. A mobile body controlling gear comprising:

a controller switched to a P control mode or a PID control mode to manipulate a mobile body; and a memory configured to hold a balance reference value of a control signal at a manipulation side in the P control mode, wherein said controller controls said mobile body in the P control mode by inputting an error of a target value and a measurement signal in the P control mode, and controls said mobile body in the PID control mode by inputting an error between the target value and said control signal on the manipulation side or between the target value and said measurement value signal in the PID control mode, and controls said mobile body in the PID control mode by subtracting said balance reference value held in said memory from said error input to said controller when status is switched from the P control mode to the PID control mode;

said controller outputting an output signal of said controller and the control signal to said mobile body to cancel an offset due to a balance reference signal of the control signal in the P control mode.

7. A mobile body controlling gear defined in claim 5, wherein said mobile body is a model helicopter, said measurement value signal is a yaw-axis angular detection signal, and said controller controls a feedback of said yaw-axis angular velocity.

8. A mobile body controlling gear defined in claim 6, wherein said mobile body is a model helicopter, said measurement value signal is a yaw-axis angular detection signal, and said controller controls a feedback of said yaw-axis angular velocity.

* * * * *

UNITED STATES PATENT AND TRADEMARK OFFICE
CERTIFICATE OF CORRECTION

PATENT NO. : 6,088,633

DATED : July 11, 2000

INVENTOR(S): Michio YAMAMOTO

It is certified that an error appears in the above-identified patent and that said Letters Patent is hereby corrected as shown below:

On the title page, item [30], the foreign application priority data is not listed. It should read as follows:

--[30] Foreign Application Priority Data

Mar. 27, 1998 [JP] Japan.............10-081121--

Signed and Sealed this

Seventeenth Day of April, 2001

Attest:

NICHOLAS P. GODICI

*Attesting Officer*     *Acting Director of the United States Patent and Trademark Office*